(No Model.)
F. ESCHAUZIER.
RUBBER DAM CLAMP.
No. 343,117. Patented June 1, 1886.
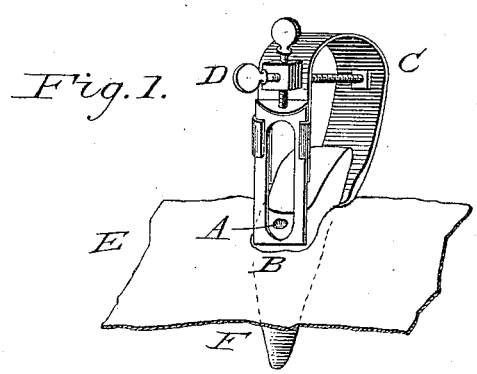
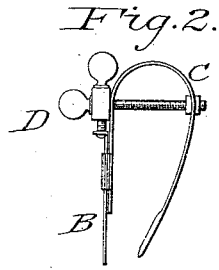
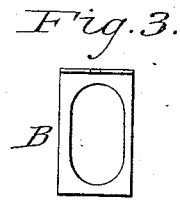
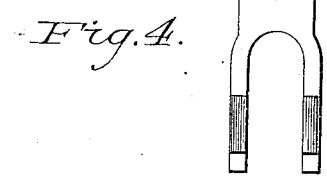
Witnesses:
Ths. A. Storey
Ernest A. Norris
Inventor.
Francis Eschauzier, D.D.S.

UNITED STATES PATENT OFFICE.

FRANCIS ESCHAUZIER, OF ALBANY, NEW YORK, ASSIGNOR TO THE S. S. WHITE DENTAL MANUFACTURING COMPANY, OF PHILADELPHIA, PENNSYLVANIA.

RUBBER DAM-CLAMP.

SPECIFICATION forming part of Letters Patent No 343,117, dated June 1, 1886.

Application filed June 29, 1885. Serial No. 170,196. (No model.)

*To all whom it may concern:*

Be it known that I, FRANCIS ESCHAUZIER, a British subject, residing in Albany, Albany county, and State of New York, have invented a new and useful Rubber Dam-Clamp, of which the following is a specification.

My invention relates to improvements in dental rubber dam-clamps in which a movable slide is operated from one arm of the clamp by a screw, said arm being suitably grooved on the sides for the slide to work in; also, to an adjustable screw passing through both arms of the clamp.

The object of said slide running in the grooved arm is to force the rubber dam used in filling teeth, and the gum covering the necks of the teeth above the cavity to be filled.

The object of the adjustable screw is to secure both arms of the clamp firmly to the tooth.

I attain these objects by the mechanism illustrated in the accompanying drawings, in which—

Figure 1 is a perspective view of the clamp, rubber dam E, and tooth F. Fig. 2 is a side view of the clamp, showing the adjustable screw D passing through both arms. Fig. 3 is a front view of the slide B. Fig. 4 shows a front view of the grooved arm in which the movable slide B operates.

Similar letters refer to similar parts throughout the several views.

Fig. 1 also shows the clamp complete attached to the tooth F by means of the screw D.

A shows the cavity under the gum, which has been exposed by depression of the slide B by means of the screw C.

What I claim as my invention, and desire to secure by Letters Patent, is—

A dental rubber dam-clamp having a forked and grooved arm in which a slide is fed by means of a set-screw, said screw passing through a lug on one arm of the clamp and secured on a lug on the slide.

FRANCIS ESCHAUZIER.

Witnesses:
JAMES E. LANSING,
CHARLES SCHERER.